F. CHAMBERLIN.
Grain-Drill.
No. 27,774. Patented Apr. 10, 1860.
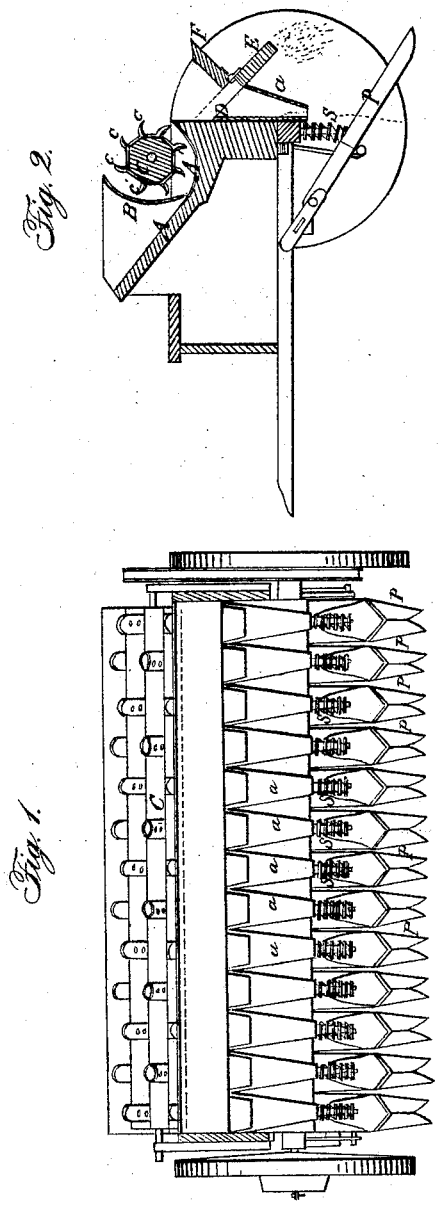

UNITED STATES PATENT OFFICE.

F. CHAMBERLIN, OF BERLIN, WISCONSIN.

IMPROVEMENT IN SEEDING-MACHINES.

Specification forming part of Letters Patent No. 27,774, dated April 10, 1860.

*To all whom it may concern:*

Be it known that I, F. CHAMBERLIN, of Berlin, in the county of Green Lake and State of Wisconsin, have invented certain new and useful Improvements in Seeding-Machines; and I do hereby declare that the following is a full, clear, and exact description of the same, reference being had to the accompanying drawings, and to the letters of reference marked thereon.

The nature of my invention consists in constructing and arranging the several parts of this machine in the manner hereinafter described.

In the annexed drawings, Figure 1 is a back view of the machine. Fig. 2 is a vertical section taken in the line of draft.

In the figures it will be seen that I use a carriage upon which the seeding apparatus is placed. This carriage is constructed in the usual way, having an axle, upon which are two wheels with tongue to draw the same.

A represents a seed-hopper, which is placed upon this carriage and secured in any convenient manner. The shape of the seed-hopper will be seen in Fig. 2.

B represents a division which is placed longitudinally in the hopper, with its bottom extending almost down to the hopper, but sufficiently far from it to allow the seed to pass under it gradually, as may be required. This division B is curved in the manner shown in Fig. 2.

C represents a cylinder placed longitudinally also in the seed-hopper, and which revolves upon suitable journals provided at its ends. Upon the periphery of this cylinder are secured a series of cups, which are made large enough to contain a grain or two of wheat. These cups are numerous, being placed a short distance apart, so as to take up and deposit the grains at proper distances from each other.

At the rear of the hopper a box, D, is secured, which is provided with a cover, F, and within is provided with a series of seed-spouts, which receive the grain from the cups and transmit it to the slides below. It will be seen that when the cover F is raised, as shown in Fig. 2, the grain will fall from the cups into the seed-spouts, and thus be carried down to the slides for drilling, but that when the lid or cover is shut down the grain will fall upon it, and, sliding over it and the inclined extension board E, will fall broadcast upon the ground.

P P P represent a series of troughs which are secured at one end to the carriage, and which drag or slide upon the ground at their other ends. S S S are a series of springs which are placed between the carriage and the troughs, and which are intended to keep the troughs in their proper positions. They keep them from rising, except when passing over prominences, &c., and keep them always upon the ground. These troughs are made angular on their under sides, and their ends which drag upon the ground are protected by metal to prevent their wearing too fast. When the lid F is raised the seed falls from the cups through the spouts *a a* and drops into the troughs P P P, which, as it will be seen, are inclined, so that it (the seed) will slide down into the furrow made by the angular portion of the drag. When the lid is down the seed is scattered broadcast, as has been described.

The cylinder C is driven by a band which passes around a pulley upon it, (the cylinder,) and then around a pulley on the axle of the carriage, which revolves. This band may be thrown off and the machine thrown out of gear by means of a lever, which may be arranged in any convenient position.

Having thus fully described my invention, what I claim as new, and desire to secure by Letters Patent, is—

1. The arrangement of the dragging seed-troughs P P P, hinged and held in position by means of springs S S S, when the same are used in connection with the seed-spouts *a a a* and seeding-cylinder C, substantially as and for the purpose specified.

2. The combination of the seeding-cylinder C, provided with cups, as set forth, with the hopper A' and A and box D, provided with seed-spouts, and with a hinged cover, F, for drilling or seeding broadcast, substantially as herein specified.

F. CHAMBERLIN.

Witnesses:
V. D. MORSE,
E. T. CHAMBERLIN.